US011019026B2

(12) United States Patent
Qi et al.

(10) Patent No.: US 11,019,026 B2
(45) Date of Patent: May 25, 2021

(54) METHOD FOR APPLYING TCP/IP PROTOCOL IN MESH NETWORK

(71) Applicant: Espressif Systems (Shanghai) Co., Ltd., Shanghai (CN)

(72) Inventors: Yuexia Qi, Shanghai (CN); Swee Ann Teo, Shanghai (CN); Jiangjian Jiang, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/968,349

(22) PCT Filed: Jan. 8, 2019

(86) PCT No.: PCT/CN2019/070740
§ 371 (c)(1),
(2) Date: Aug. 7, 2020

(87) PCT Pub. No.: WO2019/153995
PCT Pub. Date: Aug. 15, 2019

(65) Prior Publication Data
US 2021/0036986 A1 Feb. 4, 2021

(30) Foreign Application Priority Data
Feb. 9, 2018 (CN) .......................... 201810133690.6

(51) Int. Cl.
*H04L 29/12* (2006.01)
*H04W 80/04* (2009.01)
(Continued)

(52) U.S. Cl.
CPC ........ *H04L 61/2525* (2013.01); *H04L 61/103* (2013.01); *H04L 61/2007* (2013.01);
(Continued)

(58) Field of Classification Search
CPC ............... H04L 61/2525; H04L 61/103; H04L 61/2007; H04L 61/2517; H04L 61/2546;
(Continued)

(56) References Cited

U.S. PATENT DOCUMENTS 7,974,297 B2 7/2011 Jing et al.
2016/0219024 A1* 7/2016 Verzun ................. H04L 63/102
(Continued)

FOREIGN PATENT DOCUMENTS

CN 101621449 A 1/2010
CN 101945488 A 1/2011
(Continued)

*Primary Examiner* — Azizul Choudhury
(74) *Attorney, Agent, or Firm* — Reinhart Boemer Van Deuren P.C.

(57) ABSTRACT

Disclosed is a method for applying a TCP/IP protocol in a mesh network, comprising: constructing protocol stack models of a root node and one or more ordinary nodes in the mesh network; the root node using a custom IE in a management frame to share an IP configuration acquired by itself from a router, a MAC address of itself, and a MAC address of the router with the ordinary nodes; each ordinary node adopting a static IP configuration mode to set its IP configuration as that of the root node; the root node acquiring a port range available for each ordinary node; and each node in the mesh network communicating with an external IP network over a TCP/IP protocol stack. In the invention, when an IP datagram is forwarded in the mesh network, there is no need to perform layer-by-layer NAT, and no need to recalculate a checksum of the IP datagram when it reaches the root node, thereby greatly improving network communication efficiency.

10 Claims, 7 Drawing Sheets

(51) Int. Cl.
*H04W 84/12* (2009.01)
*H04W 80/06* (2009.01)

(52) U.S. Cl.
CPC ...... *H04L 61/2517* (2013.01); *H04L 61/2546* (2013.01); *H04L 61/6022* (2013.01); *H04W 80/04* (2013.01); *H04W 80/06* (2013.01); *H04W 84/12* (2013.01)

(58) Field of Classification Search
CPC .. H04L 61/6022; H04W 80/04; H04W 80/06; H04W 84/12
See application file for complete search history.

(56) References Cited

U.S. PATENT DOCUMENTS

| | | |
|---|---|---|
| 2016/0337185 A1 | 11/2016 | Hardison et al. |
| 2017/0302515 A1 | 10/2017 | Hardison et al. |

FOREIGN PATENT DOCUMENTS

| | | |
|---|---|---|
| CN | 102395167 A | 3/2012 |
| CN | 102656942 A | 9/2012 |
| CN | 104936168 A | 9/2015 |
| CN | 106534286 A | 3/2017 |
| CN | 107018200 A | 8/2017 |
| CN | 108092830 A | 5/2018 |

\* cited by examiner

METHOD FOR APPLYING TCP/IP PROTOCOL IN MESH NETWORK

TECHNICAL FIELD

The invention relates to the field of the internet data communication, and in particular to a method for applying a TCP/IP protocol in a mesh network.

BACKGROUND ART

The TCP/IP protocol is the core protocol of the internet, which is also the core protocol of most network applications. However, in a huge mesh network, there is only one sink for connecting through a router to the external network, and in such a scenario where there are multiple subnetworks in the mesh network, for external devices to access internal devices directly through the TCP/IP protocol, a parent node of each subnetwork within the mesh network is required to be equipped with a network address translation (NAT) function. Each IP datagram sent from the mesh network will have to undergo a NAT process each time when it passes the parent node before arriving at the router, and each parent node having a subnetwork will have to maintain a table for the IP datagrams passing by, recalculate a checksum for each IP packet passing by, thereby greatly reducing the mesh network efficiency.

SUMMARY OF THE INVENTION

An object of the invention is to provide a method for applying a TCP/IP protocol in a mesh network, and a network for applying the TCP/IP protocol, where the entire mesh network is not provided with IP subnetworks such that each IP datagram transmitted out of the mesh network does not have to undergo a NAT process each time when it passes the parent node before arriving at the router, and the root node in the mesh network, when performing NAT, has no need to recalculate a checksum for an IP packet, thereby improving the data communication efficiency in the mesh network.

In order to achieve the above object, the invention is implemented by the following technical solution:

a method for applying a TCP/IP protocol in a mesh network includes the steps of.

Step S1) constructing protocol stack models of a root node and one or more ordinary nodes in the mesh network.

Step S2) after the mesh network is established, the root node using a custom information element in a management frame to share an IP configuration acquired by the root node itself from a router, a MAC address of the root node itself, and a MAC address of the router with the one or more ordinary nodes within the mesh network.

Step S3) each ordinary node adopting a static IP configuration mode to set an IP configuration of the ordinary node itself as the IP configuration of the root node.

Step S4) the root node acquiring a port range available for each ordinary node; the root node mapping a MAC address of the ordinary node to a port in the port range according to a port configuration of each ordinary node, in order to enable IP datagram forwarding in a TCP/IP layer and a mesh layer in the protocol stack model of a corresponding ordinary node.

Step S5) when one of the one or more ordinary nodes initiates communication with an external IP network through a TCP/IP protocol stack, the root node directly forwarding an IP datagram passed through from the ordinary node over the mesh network to the router, and the router transmitting the IP datagram to the external IP network; and the router forwarding an IP datagram received by the router from the external IP network to the root node, and the root node mapping a port number contained in the IP datagram to a MAC address of a corresponding node, and then sending the IP datagram to the corresponding node by way of pass-through over the mesh network.

Preferably, in step S1, the protocol stack models of the one or more ordinary nodes and of the root node include, respectively:

the protocol stack models on a SoftAP interface and a Station interface of each ordinary node respectively comprise in sequence: an application layer, a TCP/IP layer, a TCP/IP adaptation layer, a mesh layer, a data link layer, and a physical layer, wherein the TCP/IP adaptation layer is provided between the TCP/IP layer and the mesh layer for adaption between the TCP/IP layer and the mesh layer.

The protocol stack model on a Station interface of the root node comprises in sequence: an application layer, a TCP/IP layer, a TCP/IP adaptation layer, a data link layer, and a physical layer.

The protocol stack model on a SoftAP interface of the root node is the same as that of each ordinary node; for each ordinary node, when sending a packet, the TCP/IP adaptation layer operates to modify a source address in a first Ethernet frame header generated by the TCP/IP layer to the address of the root node; and for the root node, the TCP/IP layer operates to manage and maintain a mapping relation between the address of and the port for the ordinary node.

Preferably, in the mesh network, each ordinary node registers a respective port number with the root node; nodes in the mesh network are of a tree topology, any node of the one or more ordinary nodes determines a port range available for itself according to a level of the node and an AID (Association ID) of a corresponding parent node, and actively reports the port range to the root node.

The port range of any node of the ordinary nodes is calculated through the following formula:

$$(L \times 1000 + AID \times 100 + 0, L \times 1000 + AID \times 100 + P)$$

wherein L represents the level of the node in the mesh network, AID represents a number identifying a connection between the node and the corresponding parent node, and $0 < P < 99$.

Preferably, the port range of each ordinary node in the mesh network is allocated by the root node.

Preferably, in the step S5, when any node of the ordinary nodes initiates communication with the external IP network through the TCP/IP protocol, the method further comprises the steps of:

step S5.1.1) any node of the one or more ordinary nodes acting as a sending node, and a parent node of the node acting as an initial receiving node which receives an 802.11 frame generated by the sending node and sent to the parent node; the generation of the 802.11 frame comprising the following process: generating application data through the application layer in the protocol stack model of the sending node, transmitting the application data to the TCP/IP layer of the sending node, then the TCP/IP layer prefixing a TCP/IP header and a first Ethernet frame header to the application data in sequence so as to form an Ethernet frame, wherein the TCP/IP header is registered with and bond to the available port range of the sending node; at this point, the first Ethernet frame header containing a destination address, a source address, and a protocol type, wherein the source address is the address of the sending node; transmitting the Ethernet frame to the TCP/IP adaptation layer of the sending node, and the TCP/IP adaptation layer modifying the source address in the first Ethernet frame header to the address of the root node, so as to form a new Ethernet frame; the TCP/IP adaptation layer transmitting the new Ethernet frame to the mesh layer.

The mesh layer prefixing a mesh header to the new Ethernet frame, the mesh header containing a destination address and a source address, wherein the destination address is the same as the destination address contained in the first Ethernet frame header of the new Ethernet frame; according to routing of the destination address in the mesh network, the mesh layer prefixing a second Ethernet frame header to the mesh header, wherein the destination address contained in the second Ethernet frame header is the address of the initial receiving node, the source address contained in the second Ethernet frame header is the address of the sending node, and the protocol type is a custom mesh protocol type; the mesh layer transmitting the Ethernet frame with the second Ethernet frame header and the mesh header to the data link layer of the sending node.

The data link layer populating the 802.11 MAC header and the LLC header according to the second Ethernet frame header, and deleting the second Ethernet frame header to form an 802.11 frame, then sending the 802.11 frame from a Station interface at the physical layer to the initial receiving node; the 802.11 MAC header contains a BSSID, which is the address of the initial receiving node, a source address, which is the address of the sending node, and a destination address, which is the address of the initial receiving node.

Step S5.1.2) after receiving the 802.11 frame through the SoftAP interface of a current receiving node, the current receiving node transmitting the 802.11 frame to the protocol stack model thereof for processing, which comprises the following process: the data link layer in the protocol stack model determining that the 802.11 frame is a mesh packet by detecting the custom mesh protocol type in the LLC header of the 802.11 frame, removing the 802.11 MAC header and the LLC header in the mesh packet, and transmitting the packet to the mesh layer in the protocol stack model; the mesh layer checking the destination address in the mesh header, and if it is determined that the destination address is not the address of the current receiving node itself or is not listed in a routing table of the current receiving node, then the mesh layer prefixes a second Ethernet frame header to the mesh header, wherein the second Ethernet frame header contains a destination address, which is the address of the parent node of the current receiving node, a source address, which is the address of the current receiving node, and a protocol type, which is the custom mesh protocol type; the mesh layer transmitting the Ethernet frame with the second Ethernet frame header to the data link layer of the current receiving node.

The data link layer of the current receiving node prefixing the 802.11 MAC header and the LLC header to the mesh header according to the second Ethernet frame header, and deleting the second Ethernet frame header to form a new 802.11 frame, wherein the 802.11 MAC header contains a BSSID, which is the address of the parent node of the current receiving node, a source address, which is the address of the receiving node, and a destination address, which is the address of the parent node of the current receiving node; the current receiving node sending the new 802.11 frame to its parent node through the Station interface at the physical layer of the current receiving node.

Step S5.1.3) when the current receiving node is not the root node, setting the parent node of the current receiving node as a new receiving node to repeat operations in the step S5.1.2.

Preferably, in the step S5.1.3, when the current receiving node is the root node, a Wi-Fi SoftAP interface of the root node receives the 802.11 frame sent by the sending node and transmits the 802.11 frame to the data link layer of the root node, and then the data link layer determines that the 802.11 frame is a mesh packet by detecting the custom mesh protocol type in the LLC header of the 802.11 frame, removes the 802.11 MAC header and the LLC header in the mesh packet, and sends a remaining part of the 802.11 frame upward to the mesh layer of the root node; the mesh layer checks the destination address in the mesh header, if it is determined that the destination address is not the address of the root node itself or is not listed in the routing table of the root node, then removes the mesh header, and sends the remaining part of the Ethernet frame upward to the TCP/IP adaptation layer of the root node; if the TCP/IP adaptation layer checks and determines that the protocol type in the first Ethernet frame header in the Ethernet frame is an IP datagram, then transmits the Ethernet frame directly to the data link layer of the root node; the data link layer of the root node prefixes an 802.11 MAC header and an LLC header to the TCP/IP header according to the first Ethernet frame header, wherein the 802.11 MAC header contains a BSSID, which is the address of the router, a source address, which is the address of the root node, and a destination address, which is the same as the destination address in the first Ethernet frame header; the LLC header contains a protocol type which is the same as the protocol type in the first Ethernet frame header; the first Ethernet frame header is deleted to form a new 802.11 frame, and the 802.11 frame is sent to the router through the Station interface of the root node.

Preferably, when the router forwards an IP datagram to any node in the mesh network, the method further comprises the steps of:

Step S5.2.1) the root node receiving an 802.11 frame forwarded by the router through the Station interface, and sending the 802.11 frame upward to the data link layer of the root node, the 802.11 frame comprising: an 802.11 MAC header, an LLC header, a TCP/IP header, and application data from the application layer; wherein the 802.11 MAC header contains a destination address, which is the address of the root node, a BSSID, which is the address of the router, and a source address, which is an address of a network device within the external IP network which generates the 802.11 frame; the LLC header contains a protocol type.

The data link layer of the root node prefixing a first Ethernet frame header to the 802.11 frame according to the 802.11 MAC header and the LLC header of the 802.11 frame, deleting the 802.11 MAC header and the LLC header to form an Ethernet frame, and sending the Ethernet frame upward to the TCP/IP adaptation layer of the root node; wherein the first Ethernet frame header contains a destination address, which is the address of the root node, a source address, which is the address of the network device within the external IP network which generates the 802.11 frame, and a protocol type in the first Ethernet frame header is the same as the protocol type in the LLC header.

If the TCP/IP adaptation layer of the root node determines, by mapping a destination port number contained in a TCP header or UDP header in the datagram, that the protocol type in the first Ethernet frame header is IP datagram, then determining the address of the destination node, and in turn determining whether the 802.11 frame is transmitted to root node itself or transmitted to a corresponding ordinary node within the mesh network.

When the TCP/IP adaptation layer determines, by mapping the port number, that the destination address of the 802.11 frame is the address of the root node, the TCP/IP adaptation layer directly transmitting the Ethernet frame to the TCP/IP layer and the application layer of the root node.

Preferably, step S5.2.2) when the TCP/IP adaptation layer determines, by mapping the port number, that the destination address the 802.11 frame is an address of an ordinary node within the mesh network, the ordinary node corresponding to the address of the ordinary node acting as a destination node, and sending the Ethernet frame to the mesh layer of the root node; according to the routing of the destination node, the mesh layer prefixing the second Ethernet frame header and the mesh header to the Ethernet frame, and then transmitting the Ethernet frame to the data link layer of the root node; the mesh header contains a destination address, which is the address of the destination node, and a source address, which is the address of the root node; the second Ethernet frame header contains a destination address, which is a destination routing address, and at this point, the destination routing address being an address of a child node directly connected to the root node along a route to the destination node, a source address, which is the address of the root node, and a protocol type, which is the custom mesh protocol type.

The data link layer populating the 802.11 MAC header and the LLC header according to the second Ethernet frame header, and deleting the second Ethernet frame header to form a new 802.11 frame; sending the 802.11 frame through the SoftAP interface to a node corresponding to the destination routing address in the 802.11 MAC header, and the node acting as a receiving node; wherein the 802.11 MAC header contains a destination address, which is the destination routing address populated with the destination address in the second Ethernet frame header, a BSSID, which is the address of the root node, and a source address, which is the address of the root node; the LLC header contains the custom mesh protocol type.

step S5.2.3) after the receiving node receives the 802.11 frame through the Station interface, the data link layer of the receiving node knows, according to the LLC header, that the 802.11 frame is a mesh packet, and deletes the 802.11 MAC header and the LLC header, and then transmits the mesh packet to the mesh layer of the receiving node; the mesh layer checking the destination address in the mesh header, and when the destination address is the address of the receiving node, deleting the mesh header to form an Ethernet frame, and transmitting the Ethernet frame to the TCP/IP layer and the application layer of the receiving node in turn.

step S5.2.4) when the destination address is listed in the routing table of the receiving node itself, the mesh layer prefixing the second Ethernet frame header to the mesh header, and then transmitting the Ethernet frame to the data link layer of the receiving node, and at this point, a destination routing address in the second Ethernet frame header is an address of a child node directly connected to the receiving node along a route to the destination node, a source address in the second Ethernet frame header is the address of the receiving node, and a protocol type in the second Ethernet frame header is the custom mesh protocol type; the data link layer populating the 802.11 MAC header and the LLC header according to the second Ethernet header, deleting the second Ethernet header to form a new 802.11 frame, wherein the 802.11 MAC header contains a destination address, which is the destination routing address populated with the destination address in the second Ethernet frame header, a BSSID, which is the address of the receiving node, and a source address, which is the address of the receiving node; the LLC header contains the custom mesh protocol type; the receiving node transmitting the new 802.11 frame downward to the child node corresponding to the destination routing address in the 802.11 MAC header of the new 802.11 frame.

Step S5.2.5) if the child node is not the destination node corresponding to the destination address in the mesh header, setting the child node as a new receiving node to repeat operations in the steps 55.2.3 to S5.2.4.

Preferably, when the 802.11 frame is an ARP request packet, upon receipt of the ARP request packet by the root node, the root node inquires an ARP cache of the root node about whether there is an IP address satisfying the request, and if the IP address requested by the sending node is found in the ARP cache of the root node, generates a first ARP reply packet to the sending node. If the IP address requested by the sending node is not found in the ARP cache of the root node, the root node modifies a sending address in the ARP request packet to the address of the root node itself to generate a second ARP request packet, and then transmits the second ARP request packet to the router. After receiving a second ARP reply packet fed back by the router, the root node refreshes the ARP cache thereof, and then transmits the second ARP reply packet to the sending node by way of pass-through over the mesh network.

Preferably, an ARP request packet sent by the sending node comprises: an 802.3 Ethernet frame header, which contains a router address, a root node address, and an ARP type; an ARP request packet body, which contains a sending address including an ordinary node address and an ordinary node IP address; the ARP request packet body also contains a destination address, and a destination IP address.

The first and the second ARP reply packets both comprises: an 802.3 Ethernet frame header, which contains a router address, a root node address, and an ARP type; an ARP reply packet body, which contains a requested router address, a router IP address, a destination address, and a destination IP address.

The second ARP request packet comprises: an 802.3 Ethernet frame header, which contains a router address, a root node address, and an ARP type; an ARP request packet body, which contains a sending address that is changed into the root node address and a root node IP address, and a destination address and a destination IP address, which are the same as the destination address and the destination IP address in the ARP request packet body of the ARP request packet.

Comparing with the prior art, the invention at least has the following advantages: with the invention, the entire mesh network does not have to be set up with IP subnetworks, so each IP datagram transmitted out of the mesh network does not have to undergo a NAT process each time when it passes the parent node before arriving at the router, and the root node in the mesh network, when performing NAT, has no need to recalculate a checksum for the IP datagram, thereby greatly improving the data communication efficiency in the mesh network.

BRIEF DESCRIPTION OF THE DRAWINGS

FIG. 8 is a structural diagram of a third data packet transmitted by a mesh layer of the intermediate node A to a data link layer of the intermediate node A according to an embodiment of the invention;

FIG. 9 is a structural diagram of a fourth data packet sent by the data link layer of the intermediate node A to the root node according to an embodiment of the invention;

FIG. 10 is a structural diagram of a fifth data packet sent by the data link layer of the root node to the router according to an embodiment of the invention;

FIGS. 11-13 are structural diagrams of the information packets processed by the protocol stack models of the root node and of the ordinary node in the mesh network, respectively, when the router or the network device in the LAN sends information packets to the mesh network according to the invention;

DETAILED DESCRIPTION OF THE PREFERRED EMBODIMENTS

The invention will be further explained in the following through a detailed description of a preferred embodiment with reference to the accompanying drawings.

Addresses in data packets or information packets as mentioned in this application refer to MAC addresses, unless otherwise specified.

Figure 1:
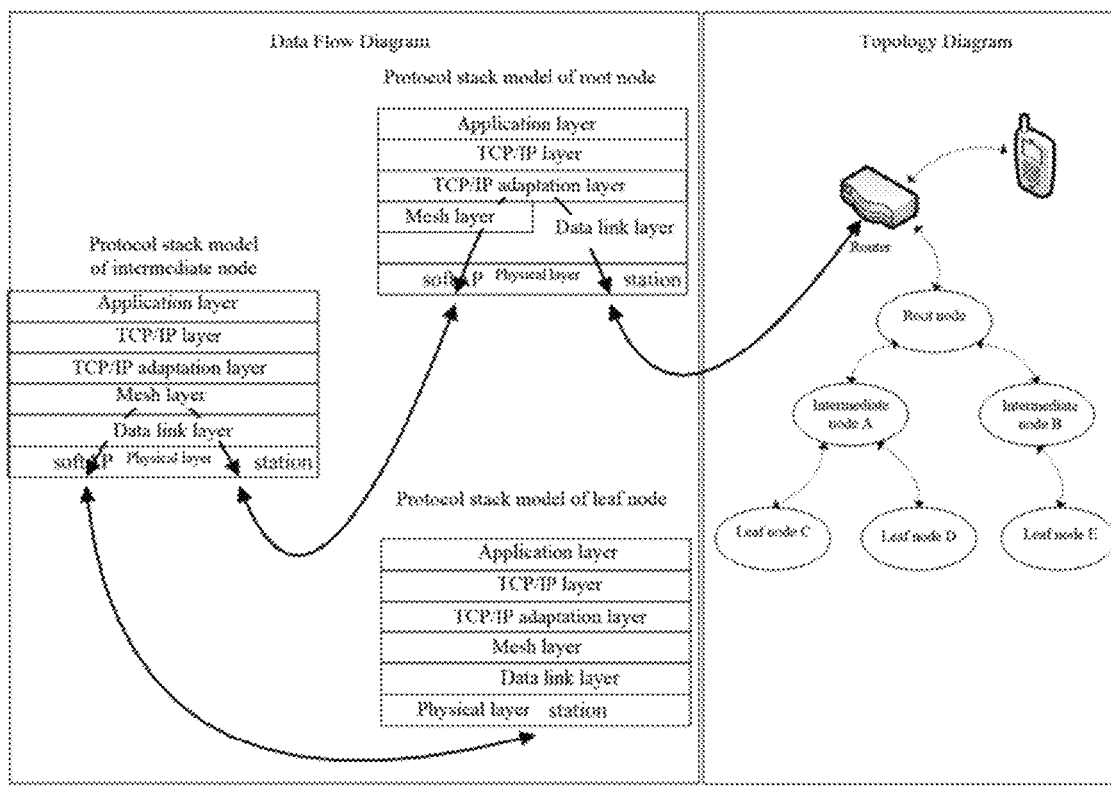
FIG. 1 is a topology diagram of the structure of a mesh network and a schematic diagram of protocol stack models of various nodes in the mesh network according to the invention.

As shown in FIG. 1, the mesh network in this embodiment exhibits a tree topology structure and includes two types of network devices. One type of the network devices is a sink of the entire mesh network, which is referred to as a root node, and the entire mesh network only has one sink. The other type covers all network devices except the root node, which are collectively referred to as ordinary nodes. There is a parent-child relation between ordinary nodes, a parent-child relation between the root node and second level nodes connected with the root node, a parent-child relation between nodes at adjacent upper and lower levels, and a sibling relation between nodes connected with a same parent node. The nodes are connected downward to child nodes through the SoftAP interface in order to expand the mesh network, and are connected upward to the parent node through the Station interface. Specifically, in the tree topology structure of the mesh network, the ordinary nodes are categorized into intermediate nodes and leaf nodes, the root node and the ordinary nodes can both generate data packets, and the root node connected upward to the router is the only sink for the mesh network to access the external IP network; and the root node manages and maintains a routing table of the entire mesh network. An intermediate node is equipped with a forwarding function within the mesh network; the intermediate node only manages and maintains a routing table of its own subnetwork; in the tree topological network, a subnetwork refers to all descendant nodes under the intermediate node, including child nodes directly connected with the intermediate node, as well as nodes connected with the child nodes of the intermediate node, and so on. Leaf nodes are not equipped with any forwarding function within the mesh network; and the leaf nodes have no routing table.

As shown in FIG. 1, the root node is connected with the router, the intermediate nodes A and B are connected upward with the root node through the Station interface, and the intermediate node A is connected downward with leaf nodes C and D, respectively, through the SoftAP interface. The intermediate node B is connected downward with the leaf node E through the SoftAP interface.

A mesh protocol defines a destination address and a source address which are used for enabling data routing and forwarding at the mesh layer. Protocol stack models of various nodes are shown in FIG. 1, in which the root node has a protocol stack model different from those of the intermediate nodes and of the lead nodes; and the intermediate nodes and the leaf nodes may have the same protocol stack model. The protocol stack models on the SoftAP interface and the Station interface of the ordinary nodes both include: an application layer, a TCP/IP layer, a TCP/IP adaptation layer, a mesh layer, a data link layer, and a physical layer; the TCP/IP adaptation layer is provided between the TCP/IP layer and the mesh layer for adaption between the TCP/IP layer and the mesh layer; the protocol stack model on the Station interface of the root node has no mesh layer; the protocol stack model on the SoftAP interface of the root node is the same as that of the ordinary node; for the ordinary node, when sending a packet, the TCP/IP adaptation layer operates to modify a source address in a first Ethernet frame header generated by the TCP/IP layer to the address of the root node; and for the root node, the TCP/IP layer operates to manage and maintain a mapping relation between an address of and a port for the ordinary node.

A method for applying a TCP/IP protocol in a Wi-Fi mesh network according to the invention includes the following process:

regarding the IP configuration for the ordinary node, it includes the following process: after the Wi-Fi mesh network is established, the root node in the mesh network sends a request to a router outside the mesh network and obtain an IP configuration, and then the root node shares the obtained IP configuration, its own MAC address, and a MAC address of the router with all ordinary nodes in the mesh network through custom information elements (IE) in management frames. All nodes share one IP address, thereby eliminating a process that each node requests an IP address from the router.

Each ordinary node adopts a static IP configuration mode to set an IP configuration of the ordinary node as the IP configuration of the root node; and the entire mesh network has no IP subnetwork such that there is no need to perform NAT at each parent node. The root node does not need to recalculate the checksum of an IP packet when the root node forwards the IP packet of the ordinary node to the router.

The port configuration for the ordinary node includes the following process:

The root node needs the port configuration of each ordinary node to map the MAC address of the ordinary node to a port, in order to enable forwarding of various data packets in the TCP/IP layer and the mesh layer. The port configuration of the node is negotiated by the ordinary node and the root node, and it must be ensured that each port number may only be used by a unique ordinary node.

A first method for port configuration is that the root node actively allocates the port configuration for each ordinary node and notifies each ordinary node.

A second method for port configuration is that each ordinary node actively registers with the root node for a unique port configuration. In such an embodiment, any node from the ordinary nodes may determine a port range available for itself based on its level in the mesh network and an AID of its corresponding parent node, and this node may actively report the port range to the root node; the port range of any node from the ordinary nodes is calculated according the following formula:

$$(L \times 1000 + AID \times 100 + 0, L \times 1000 + AID \times 100 + P)$$

in which L represents the level of the node in the mesh network, the AID represents a number identifying a connection between the node and the corresponding parent node, and P represents the maximum number of port numbers allowed for this node (0<P<99).

Figure 2:
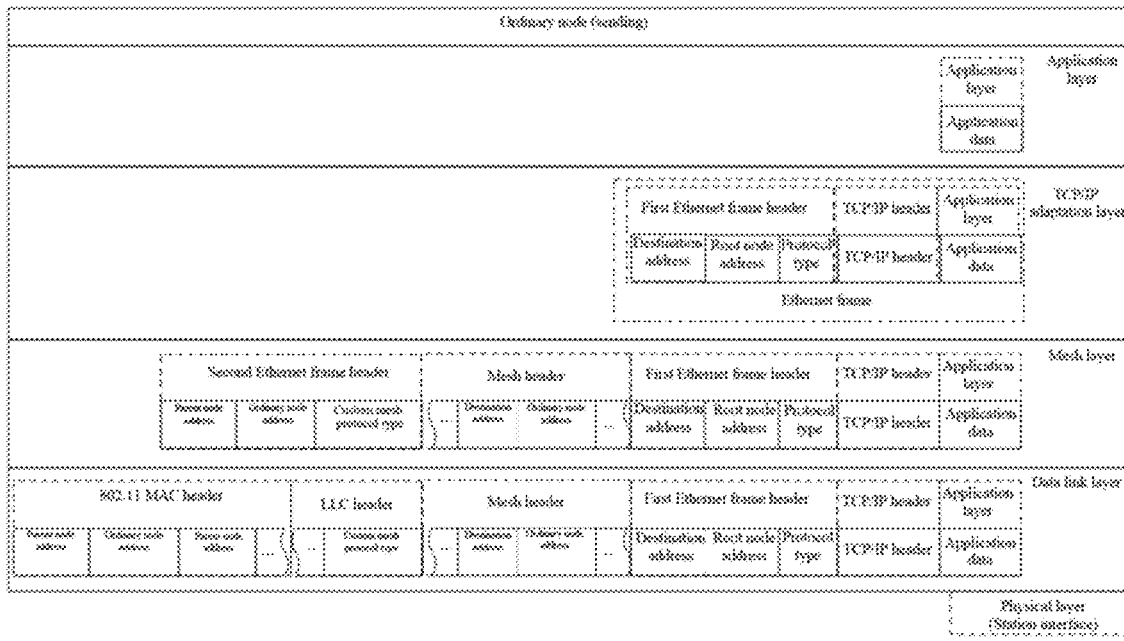
FIGS. 2-4 are respectively structural diagrams of data packets processed by the protocol stack models in various nodes when an ordinary node, an intermediate node among the ordinary nodes, and a root node according to the invention send IP datagrams to a router or a network device in a local area network (LAN)

As shown in FIG. 2, when any ordinary node in the mesh network sends an IP datagram to the router, the ordinary node generates a data packet that includes: application data from the application layer; an Ethernet frame which generates application data for the application layer of the ordinary node, and according to the above described port configuration method, transmits the application data to the TCP/IP layer of the ordinary node, and then the TCP/IP layer prefixes a TCP/IP header and a first Ethernet frame header to the Ethernet frame in sequence to form an Ethernet frame, and the TCP/IP header has registered with and bond to the available port range of the ordinary node. The first Ethernet frame header contains a destination address and generates a source address and a protocol type of the application data, and the source address is the address of the ordinary node when the Ethernet frame is in the TCP/IP layer. The Ethernet frame is transmitted to the TCP/IP adaptation layer of the ordinary node, then the TCP/IP adaptation layer modifies the source address in the first Ethernet frame header in the Ethernet frame to the address of the root node so as to form a new Ethernet frame. The TCP/IP adaptation layer transmits the new Ethernet frame to the mesh layer.

The mesh header contains a destination address and a source address. The destination address is the same as the destination address in the first Ethernet frame header of the new Ethernet frame, which is formed by the mesh layer, and the destination address is obtained by copying the destination address in the first Ethernet frame header of the new Ethernet frame into the mesh header.

In the mesh layer, according to the routing of the destination address in the mesh network, the mesh layer prefixes a second Ethernet frame header to the mesh header, and the second Ethernet frame header contains a destination address, which is the address of the parent node of the ordinary node, a source address, which is the address of the ordinary node, and a protocol type, which is the custom mesh protocol type. The mesh layer transmits the Ethernet frame with the second Ethernet frame header and the mesh header to the data link layer of the ordinary node.

For the 802.11 MAC header and the LLC header, the 802.11 MAC header and the LLC header are populated by their data link layer according to the second Ethernet frame header, and the second Ethernet frame header is deleted, As the data is sent from the Station interface at the physical layer, the 802.11 MAC header contains a BSSID, a source address, and a destination address in sequence.

In the present embodiment, the 802.11 MAC header contains a BSSID, which is the address of the parent node of the ordinary node, a source address, which is the address of the ordinary node, and a destination address, which is the address of the parent node of the ordinary node.

Figure 3:
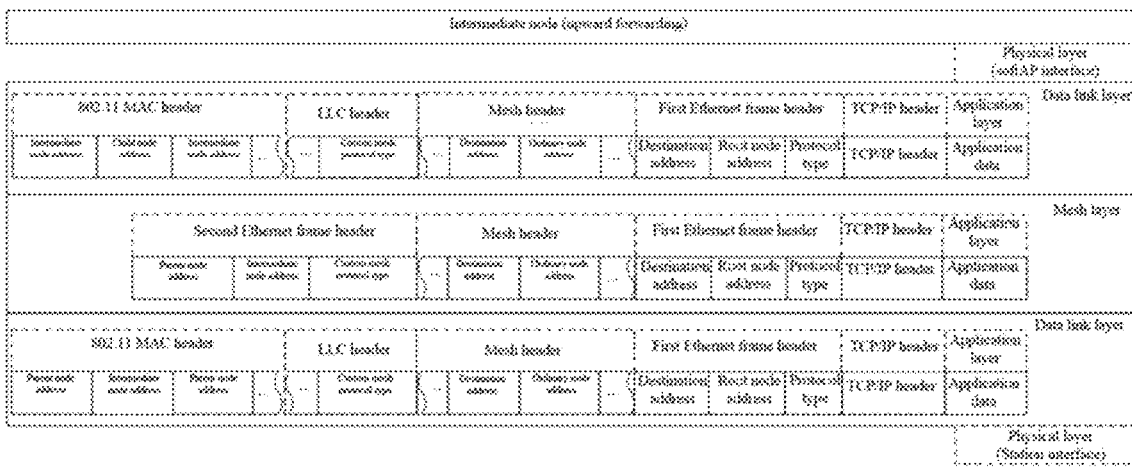

As shown in FIG. 3, the ordinary node generates and sends the data packet to the parent node of the ordinary node through the Station interface at the physical layer. When the parent node is an intermediate node: a SoftAP interface provided in the intermediate node receives and transmits the data packet to a data link layer of the intermediate node; the data link layer determines that the data packet is a mesh packet by detecting the custom mesh protocol type in the LLC header of data packet, removes the 802.11 MAC header and the LLC header from the mesh packet and sends the remaining part of the data packet upward to the mesh layer of the intermediate node; the mesh layer of the intermediate node checks the destination address in the mesh header and if it is determined that the destination address is not the address of the intermediate node itself or is not listed in the routing table of the intermediate node, then the mesh layer proceeds to send the packet upward to the parent node of the intermediate node, in which sending the packet to the parent node of the intermediate node includes the following process: the mesh layer prefixes a second Ethernet frame header to the mesh header, and the second Ethernet frame header contains a destination address, which is the address of the parent node of the intermediate node, a source address, which is the address of the intermediate node sending the packet, and a protocol type, which is the custom mesh protocol type. The mesh layer transmits the Ethernet frame with the second Ethernet frame header to the data link layer of the intermediate node.

The data link layer of the intermediate node prefixes an 802.11 MAC header and an LLC header to the mesh header according to the second Ethernet frame header, and as the data is sent from the Station interface at the physical layer, the 802.11 MAC header contains a BSSID, a source address (i.e., the address of the node which sends the data packet), and a destination address. In the present embodiment, the 802.11 MAC header contains a BSSID, which is the address of the parent node of the intermediate node, a source address, which is the address of the intermediate node, and a destination address, which is the address of the parent node of the ordinary node. The intermediate node sends the data packet to the parent node of the intermediate node through the Station interface at the physical layer.

When the parent node of the intermediate node is not a root node, the process performed by the intermediate node for the data packet is repeated, until the data packet is transmitted to the root node by way of pass-through over the mesh network.

Figure 4:
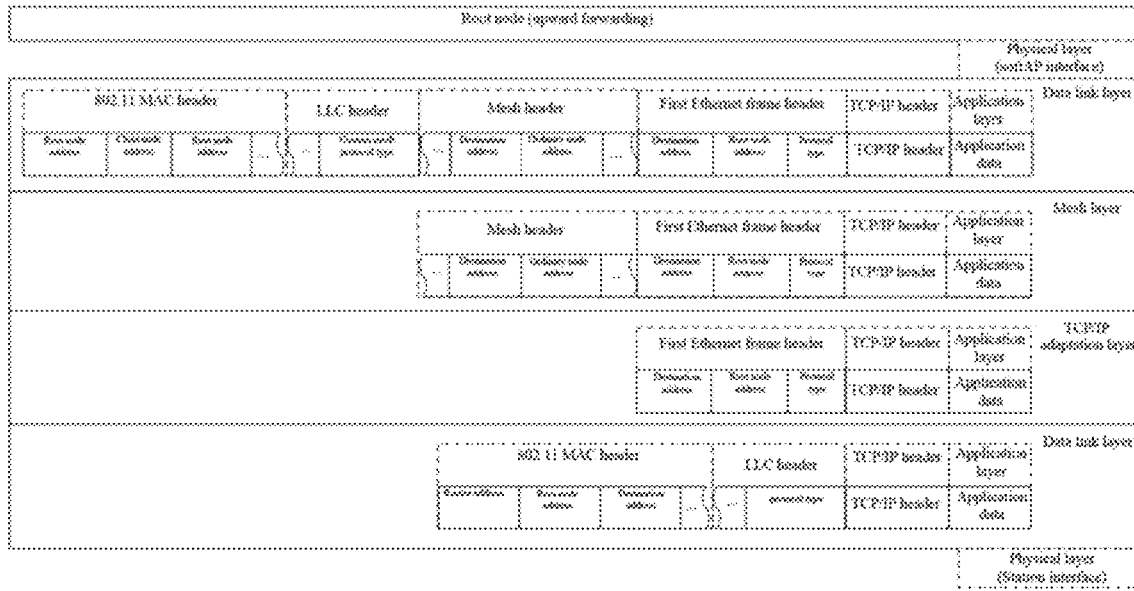

As shown in FIG. 4, the SoftAP interface provided in the root node receives and transmits the above described data packet to the data link layer of the root node; then the data link layer determines that the data packet is a mesh packet by detecting the custom mesh protocol type in the LLC header of the data packet, removes the 802.11 MAC header and the LLC header of the mesh packet and sends the remaining part of the data packet upward to the mesh layer of the root node; then the mesh layer checks the destination address in the mesh header, and if it is determined that the destination address is not the address of the root node itself or is not listed in the routing table of the root node, removes the mesh header and sends the remaining part of the Ethernet frame upward to the TCP/IP adaptation layer of the root node; the TCP/IP adaptation layer checks the protocol type in the first Ethernet frame header in the Ethernet frame; if the protocol type is IP datagram (0x0800), then the TCP/IP adaptation layer does nothing to the Ethernet frame but transmits the Ethernet frame directly to the data link layer of the root node; the data link layer of the root node prefixes an 802.11 MAC header and an LLC header to the TCP/IP header according to the first Ethernet frame header, and as the data is sent from the Station interface at the physical layer, the 802.11 MAC header contains a BSSID, a source address, and a destination address in sequence. In the present embodiment, the 802.11 MAC header contains a BSSID, which is the address of the router, a source address, which is the address of the root node, and a destination address, which is the same as the destination address in the first Ethernet frame header. The LLC header contains a protocol type which is the same as that of the first Ethernet frame header. The first Ethernet frame header is deleted, and the data packet is sent to the router through the Station interface at the physical layer.

Figure 5:
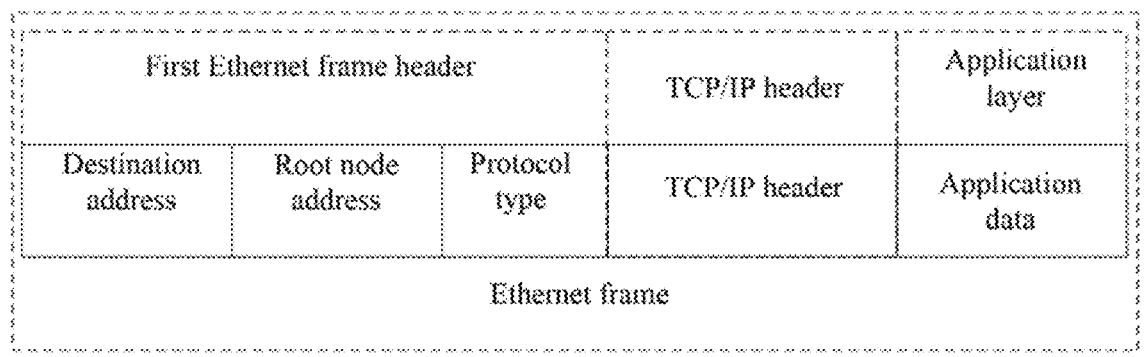
FIG. 5 is a structural diagram of an Ethernet frame generated by a leaf node C according to an embodiment of the invention.
Figure 6:
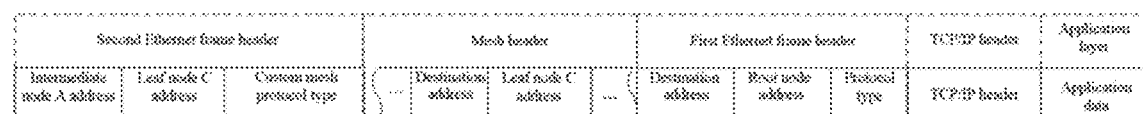
FIG. 6 is a structural diagram of a first data packet transmitted by a mesh layer in the leaf node C to a data link layer in the leaf node C according to an embodiment of the invention.

According to an embodiment of the invention, when the leaf node C as shown in FIG. 1 sends an IP datagram to a smart phone in the LAN, it includes the following process: after the application layer of the leaf node C generates application data and the leaf node C binds a port range available for the leaf node C itself, the application data passes through the TCP/IP layer and the TCP/IP adaptation layer, and then generates an Ethernet frame as shown in FIG. 5, in which a first Ethernet frame header provided in the Ethernet frame includes a destination address, a source address, and a protocol type; in the present embodiment, the destination address is a MAC address of the smart phone in the LAN; and the source address is modified by the TCP/IP adaptation layer to the address of the root node. The TCP/IP adaptation layer transmits the Ethernet frame to the mesh layer of the leaf node C. The mesh layer fetches out the destination address from the first Ethernet frame header to populate the destination address in the mesh header and populate the source address in the mesh header with the address of the leaf node C, and generates a second Ethernet frame header according to the routing of the destination address in the mesh network to form a first data packet as shown in FIG. 6, and then sends the first data packet to the data link layer of the leaf node C. The address of the intermediate node A is populated to the destination address of the second Ethernet frame header, the address of the leaf node C is populated to the source address in the second Ethernet frame header, and the custom mesh protocol type is populated to the protocol type in the second Ethernet frame header.

Figure 7:
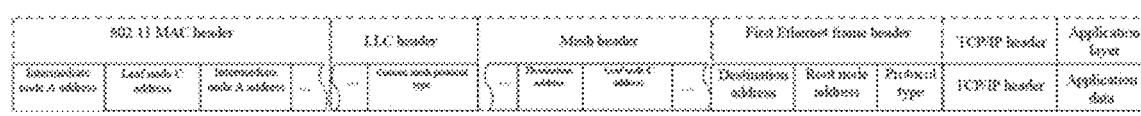
FIG. 7 is a structural diagram of a second data packet sent by the data link layer in the leaf node C to an intermediate node A according to an embodiment of the invention.

The data link layer of the leaf node C populates the protocol type in the LLC header and the address in the 802.11 MAC header according to the second Ethernet frame header, then deletes the second Ethernet frame header to form a second data packet (802.11 frame) as shown in FIG. 7, and then transmits the second data packet to the intermediate node A through the Station interface at the physical layer. The address of the intermediate node A is populated to the BSSID in the 802.11 MAC header, the address of the leaf node C is populated to the source address in the 802.11 MAC header, and the address of the intermediate node A is populated to the destination address in the 802.11 MAC header. The custom mesh protocol type is populated to the protocol type in the LLC header.

Figures 8, 9, 10, 11:
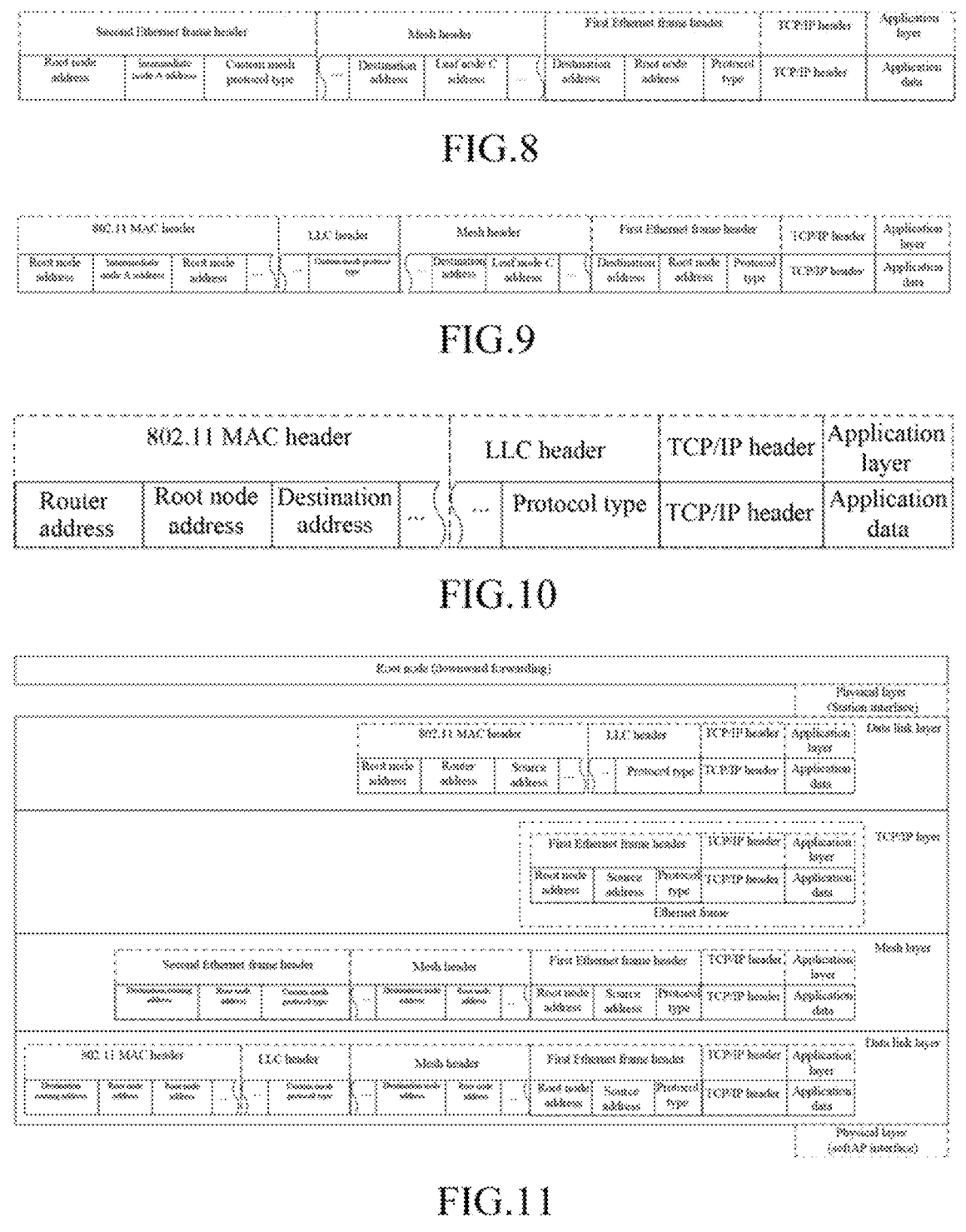

After the intermediate node A receives the second data packet transmitted from the leaf node C through the SoftAP interface, the data link layer determines that the second data packet is a mesh packet according to the custom mesh protocol type in the LLC header. The 802.11 MAC header and the LLC header are removed, and the mesh packet is transmitted upward to the mesh layer; the mesh layer checks the destination address in the mesh header, and if it is determined that the mesh packet is not transmitted to the intermediate node A itself and the destination address is not listed in the routing table of the intermediate node A, then it is decided to send the mesh packet upward to the parent node (root node) of the intermediate node A, and prefixes a second Ethernet frame header to the mesh header to form a third data packet as shown in FIG. 8; and then the third data packet is sent to the data link layer of the intermediate node A. In the present embodiment, the address of the root node is populated to the destination address in the second Ethernet frame header of the third data packet, the address of the intermediate node A is populated to the source address in the second Ethernet frame header of the third data packet, and the custom mesh protocol type is populated to the protocol type in the second Ethernet frame header of the third data packet.

The data link layer of the intermediate node A populates the protocol type in the LLC header and the address in the 802.11 MAC header according to the second Ethernet frame header added by the mesh layer, then deletes the second Ethernet frame header to form a fourth data packet as shown in FIG. 9, and then transmits the fourth data packet to the root node through the Station interface. In the present embodiment, the address of the root node is populated to the BSSID in the 802.11 MAC header, the address of the intermediate node A is populated to the source address in the 802.11 MAC header, and the address of the root node is populated to the destination address in the 802.11 MAC header. The protocol type of the LLC head is populated with the custom mesh protocol type.

After the root node receives the fourth data packet transmitted from the intermediate node A through the SoftAP interface, the data link layer of the root node determines that the fourth data packet is a mesh packet according to the custom mesh protocol type in the LLC header. The 802.11 MAC header and the LLC header are removed, and the fourth data packet is transmitted upward to the mesh layer; the mesh layer checks the destination address in the mesh header, and if it is determined that the fourth data packet is not transmitted to the root node itself and the destination address is not listed in the routing table of the root node, then removes the mesh header and transmits the fourth data packet upward to the TCP/IP adaptation layer; the TCP/IP adaptation layer checks the protocol type in the Ethernet frame of the fourth data packet, finds out that it is IP data (0x0800), and does nothing but directly transmits the fourth data packet downward to the data link layer; the data link layer populates the protocol type in the LLC header and the address in the 802.11 MAC header according to the first Ethernet frame header in the fourth data packet, deletes the first Ethernet frame header to form a fifth data packet as shown in FIG. 10, and transmits the fifth data packet to the router through the Station interface.

The router forwards the fifth data packet to the smart phone in the LAN which feeds back to the router with an information packet. The router transmits the information packet to the root node, and passes through the information packet over the mesh network to the node which generates the above described data packet. In the present embodiment, the information packet is transmitted to the leaf node C.

Figure 12:
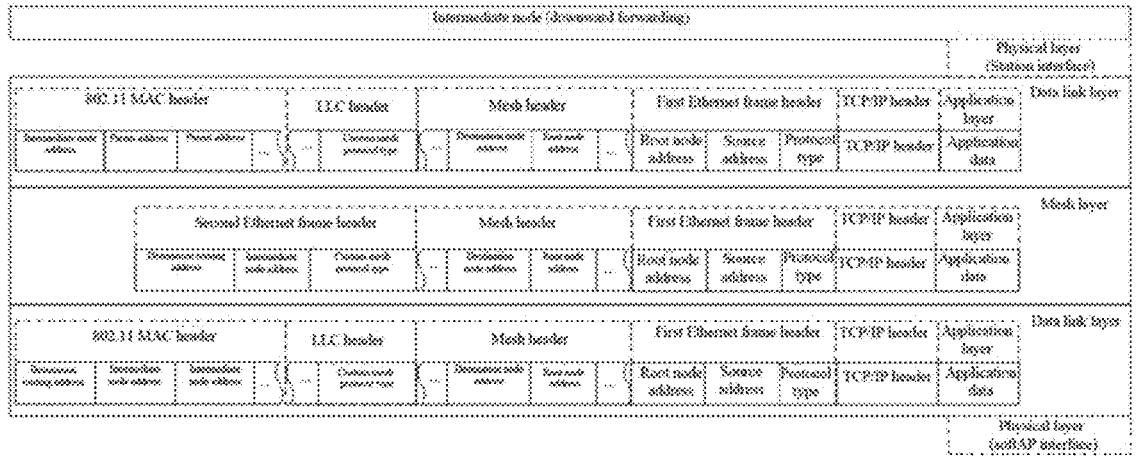
Figure 13:
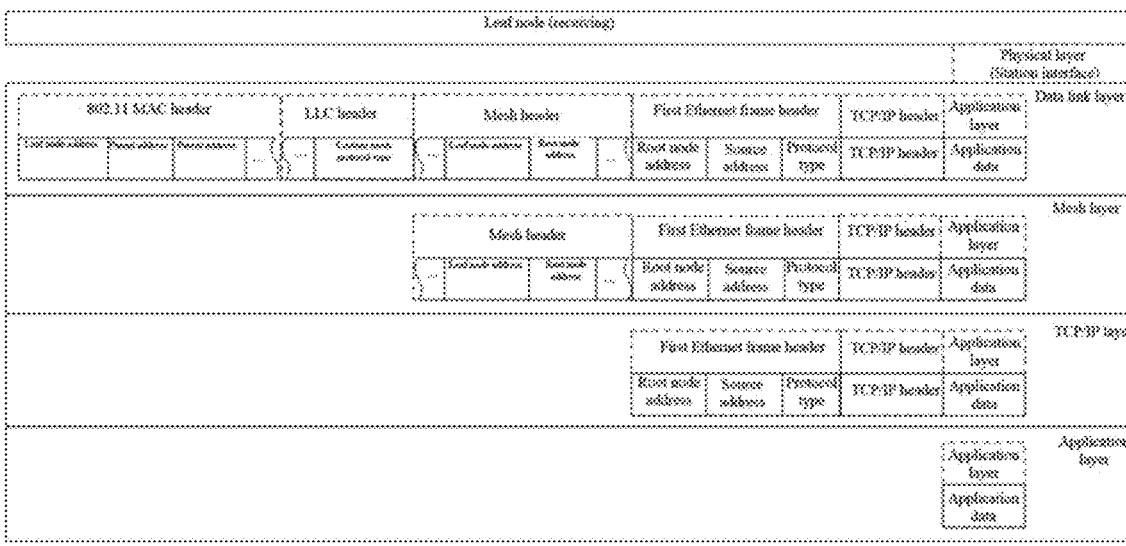

With reference to FIGS. 11-13, the nodes in the mesh network forward and/or process the information packet sent from the router, including the following process: the root node receives the information packet (802.11 frame) forwarded from the router through the Station interface and transmits the information packet upward to the data link layer of the root node. As shown in FIG. 11, the information packet includes: an 802.11 MAC header, an LLC header, a TCP/IP header, and application data from the application layer. The information packet is received from the router through the Station interface of the root node, so the 802.11 MAC header contains a destination address, a BSSID, and a source address in sequence. In the present embodiment, the 802.11 MAC header contains a destination address, which is the address of the root node, a BSSID, which is the address of the router, and a source address, which is the address of the network device in the LAN which generates the information packet. The LLC header contains the protocol type.

The data link layer of the root node prefixes a first Ethernet frame header to the TCP/IP header according to the 802.11 MAC header and the LLC header of the information packet, deletes the 802.11 MAC header and the LLC header to form an Ethernet frame, and transmits the Ethernet frame upward to the TCP/IP adaptation layer of the root node. In the present embodiment, the address of the root node is populated to the destination address in the first Ethernet frame header of the Ethernet frame, the address of the network device in the LAN which generates the information packet is populated to the source address in the first Ethernet frame header, and the protocol type in the LLC header is populated to the protocol type of the first Ethernet frame header.

After the TCP/IP adaptation layer of the root node receives the above described Ethernet frame, it determines that the protocol type in the first Ethernet frame header is IP datagram (0x0800), and determines the address of the destination node by mapping the destination port number contained in the TCP header or UDP header in the datagram, and in turn determines whether the information packet is transmitted to the root node itself or transmitted to an ordinary node within the mesh network.

When the TCP/IP adaptation layer determines, by mapping the port number, that the address of the destination node is the address of the root node, the TCP/IP adaptation layer directly transmits the above described Ethernet frame to the TCP/IP layer and the application layer of the root node.

When the TCP/IP adaptation layer determines, by mapping the port number, that the address of the destination node is the address of an ordinary node in the mesh network, the TCP/IP adaptation layer sends the Ethernet frame to the mesh layer of the root node, and the mesh layer prefixes a second Ethernet frame header and a mesh header according to the routing of the ordinary node, and then transmits the Ethernet frame to the data link layer of the root node. The destination address in the mesh header is the address of the ordinary node mapped by the above described port number, and the source address in the mesh header is the address of the root node. The destination address in the second Ethernet frame header is the destination routing address (which is the address of a node directly connected with the root node along a route to the above described destination node). The data link layer populates the 802.11 MAC header and the LLC header according to the second Ethernet frame header, and deletes the second Ethernet frame header to form an 802.11 frame. The 802.11 frame is sent through the SoftAP interface to the ordinary node corresponding to the destination routing address in the 802.11 MAC header. In the present embodiment, the 802.11 MAC header contains a destination address, which is the same as the destination address in the second Ethernet frame header, i.e., the destination routing address, a BSSID, which is the address of the root node, and a source address, which is the address of the root node. The LLC header contains the custom mesh protocol type.

As shown in FIG. 12, after the above described ordinary node matching the destination routing address receives the above described 802.11 frame through the Station interface, the data link layer of the ordinary node knows that the 802.11 frame is a mesh packet according to the LLC header, deletes the 802.11 MAC header and the LLC header, and then transmits the mesh packet to the mesh layer of the ordinary node; the mesh layer receives the mesh packet and checks the destination address in the mesh header; when the destination address is the ordinary node itself, the mesh layer deletes the mesh header to form an Ethernet frame, and transmits the Ethernet frame to the TCP/IP layer and the application layer of the ordinary node in sequence. The mesh layer receives the mesh packet and checks the destination address in the mesh header. When the destination address is listed in the routing table of the above described ordinary node, the mesh layer prefixes a second Ethernet frame header to the mesh header, and then transmits the Ethernet frame to the data link layer of the ordinary node. The destination address in the second Ethernet frame header is the destination routing address (which is the address of a child node directly connected with the ordinary node along a route to the destination node), the source address in the second Ethernet frame header is the address of the ordinary node, and the protocol type in the second Ethernet frame header is the custom mesh protocol type. The data link layer populates the 802.11 MAC header and the LLC header according to the second Ethernet frame header, and deletes the second Ethernet frame header to form a new 802.11 frame. If the destination address in the 802.11 MAC head is the same as the destination address in the second Ethernet frame header, i.e., the destination routing address, the BSSID is the address of the ordinary node, and the source address is the address of the ordinary node. The LLC header contains the custom mesh protocol type. The ordinary node sends the new 802.11 frame downward to the ordinary node corresponding to the destination routing address in the 802.11 MAC header. The above described process is repeated, until the ordinary node corresponding to the destination routing address is the destination node corresponding to the destination address in the mesh header.

As shown in FIG. 13, after the above described destination node receives the above described 802.11 frame through the Station interface, the data link layer of the destination node knows that the 802.11 frame is a mesh packet according to the LLC header, deletes the 802.11 MAC header and the LLC header, and then transmits the mesh packet to the mesh layer of the destination node; the mesh layer receives the mesh packet and checks the destination address in the mesh header, when the destination address is the destination node itself, deletes the mesh header to form an Ethernet frame, and transmits the Ethernet frame to the TCP/IP layer and the application layer of the destination node in sequence.

Figure 14:
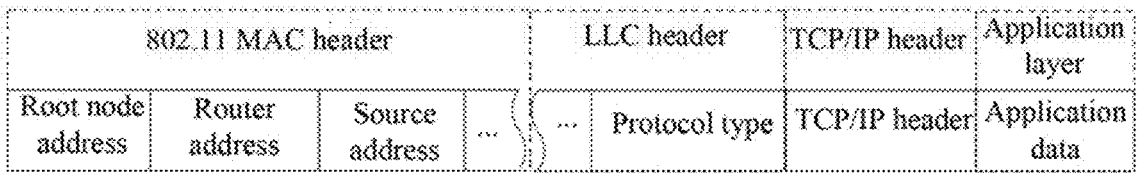
FIG. 14 is a structural diagram of a first information packet from the router and received by the data link layer of the root node according to an embodiment of the invention.

According to an embodiment of the invention, when the router forwards an IP datagram from the smart phone in the LAN to the leaf node C as shown in FIG. 1, the smart phone generates a first information packet (802.11 frame) as shown in FIG. 14, and transmits the first information packet to the root node through the router. The 802.11 MAC header of the information packet contains a destination address, which is the address of the root node, a BSSID, which is the address of the router, and a source address, which is the MAC address of the smart phone. The LLC header contains the protocol type.

Figure 15:
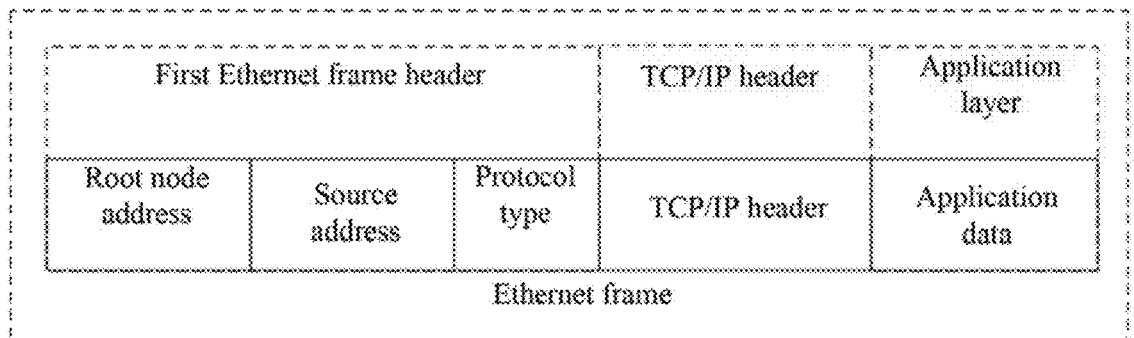
FIG. 15 is a structural diagram of the Ethernet frame received by the TCP/IP adaptation layer of the root node according to an embodiment of the invention.

The data link layer of the root node prefixes a first Ethernet frame header to the TCP/IP header according to the 802.11 MAC header and the LLC header of the information packet, deletes the 802.11 MAC header and the LLC header to form an Ethernet frame as shown in FIG. 15, and transmits the Ethernet frame upward to the TCP/IP adaptation layer of the root node. In the present embodiment, the address of the root node is populated to the destination address in the first Ethernet frame header of the Ethernet frame, the MAC address of the smart phone is populated to the source address in the first Ethernet frame header, and the protocol type in the LLC header is populated to the protocol type of the first Ethernet frame header.

Figure 16:
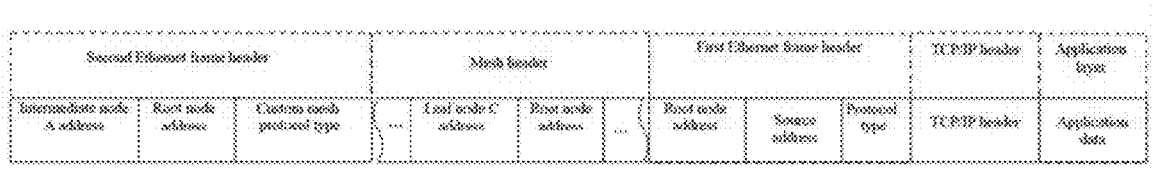
FIG. 16 is a structural diagram of a second information packet transmitted by the mesh layer of the root node to the data link layer of the root node according to an embodiment of the invention.
Figure 17:
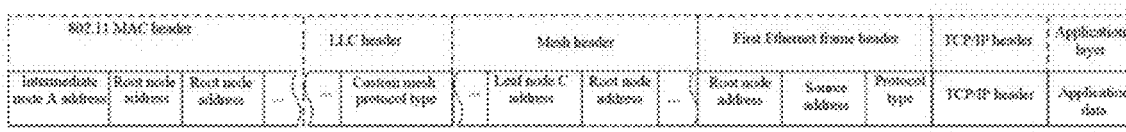
FIG. 17 is a structural diagram of a third information packet sent by the data link layer of the root node to the intermediate node A according to an embodiment of the invention.

After the TCP/IP adaptation layer of the root node receives the Ethernet frame, it checks and determines that the protocol type in the first Ethernet frame header is IP datagram, and determines an address of the destination node, which is the address of the leaf node C, by mapping a destination port number contained in the TCP header or UDP header in the datagram, and in turn determines that the first information packet is to be transmitted to the leaf node C, then the TCP/IP adaptation layer transmits the Ethernet frame to the mesh layer of the root node. According to the routing of the ordinary node, the mesh layer prefixes a second Ethernet frame header and a mesh header to form a second information packet as shown in FIG. 16, and transmits the second information packet to the data link layer of the root node. The destination address in the mesh header is the address of the lead node C mapped by the above described port number, and the source address in the mesh header is the address of the root node. The destination address in the second Ethernet frame header is the address of the intermediate node A, the source address in the second Ethernet frame header is the address of the root node, and the protocol type in the second Ethernet frame header is the custom mesh protocol type. The data link layer populates the 802.11 MAC header and the LLC header according to the second Ethernet frame header of the second information packet, and then deletes the second Ethernet frame header to form a third information packet (802.11 frame) as shown in FIG. 17. The third information packet is sent through the SoftAP interface to the intermediate node A corresponding to the destination address in the 802.11 MAC header. In the present embodiment, the destination address in the 802.11 MAC header is the same as the destination address in the second Ethernet frame header, i.e., the address of the intermediate node A, the BSSID is the address of the root node, and the source address is the address of the root node. The LLC header contains the custom mesh protocol type.

Figure 18:
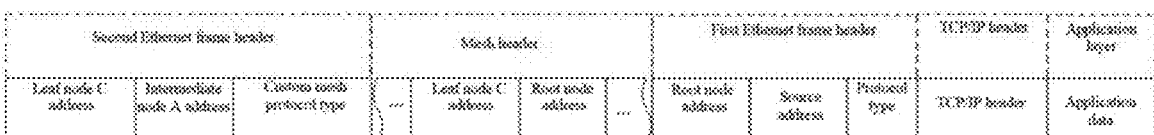
FIG. 18 is a structural diagram of a fourth information packet transmitted by the mesh layer of the intermediate node A to the data link layer of the intermediate node A according to an embodiment of the invention.

The intermediate node A receives the third information packet forwarded from the root node through the Station interface of the intermediate node A. The data link layer of the intermediate node A determines that the third information packet is a mesh packet according to the custom mesh protocol type in the LLC header, removes the 802.11 MAC header and the LLC header, and then transmits the mesh packet upward to the mesh layer. The mesh layer checks and determines that the address of the leaf node C in the mesh header of the mesh packet is listed in the routing table of the intermediate node A, then prefixes a second Ethernet frame header to the mesh header to form a fourth information packet as shown in FIG. 18, and transmits the fourth information packet to the data link layer of the intermediate node A. The destination address in the second Ethernet frame header of the fourth information packet is the address of the leaf node C, the source address in the second Ethernet frame header is the address of the intermediate node A, the protocol type in the second Ethernet frame header is the custom mesh protocol type.

Figure 19:
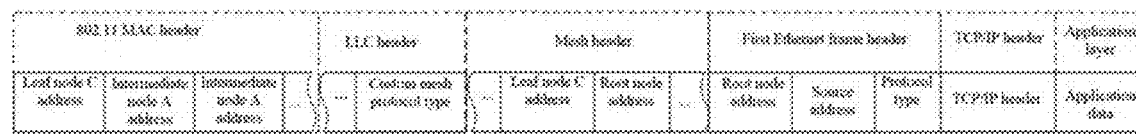
FIG. 19 is a structural diagram of a fifth information packet transmitted by the data link layer of the intermediate node A to the leaf node C according to an embodiment of the invention.

The data link layer prefixes an LLC header and an 802.11 MAC header according to the second Ethernet frame header of the fourth information packet, and then deletes the second Ethernet frame header to form a fifth information packet as shown in FIG. 19. The intermediate node A transmits the fifth information packet to the leaf node C through the SoftAP interface. In the present embodiment, the destination address in the 802.11 MAC header of the fifth information packet is the same as the destination address in the second Ethernet frame header, i.e., the address of the leaf node C, the BSSID is the address of the intermediate node A, and the source address is the address of the intermediate node A. The LLC header contains the custom mesh protocol type.

The leaf node C receives the fifth information packet forwarded from the intermediate node A through the Station interface. The data link layer of the leaf node C determines that the fifth information packet is a mesh packet according to the custom mesh protocol type in the LLC header, removes the 802.11 MAC header and the LLC header, and transmits the mesh packet upward to the mesh layer. The mesh layer checks and determines that the destination address in the mesh header of the mesh packet is the address of the leaf node C itself, then removes the mesh header in the mesh packet to form an Ethernet frame as shown in FIG. 15, and transmits the Ethernet frame upward to the TCP/IP layer and the application layer in sequence.

According to an embodiment of the invention, if any ordinary node in the mesh network sends an. ARP request packet to the router, and when the ordinary node performs adaptation to the TCP/IP layer, the ordinary node modifies the source address in the 802.3 Ethernet frame header in the ARP data packet to the MAC address of the root node through the ordinary node generating the ARP request packet. The ARP request packet is transmitted to the root mode by way of pass-through over the mesh network. The pass-through of the ARP request packet to the root node over the mesh network may be implemented according to the same process of the pass-through of a data packet to the root node when any ordinary node in the mesh network is sending an IP datagram to the router.

Figure 20:
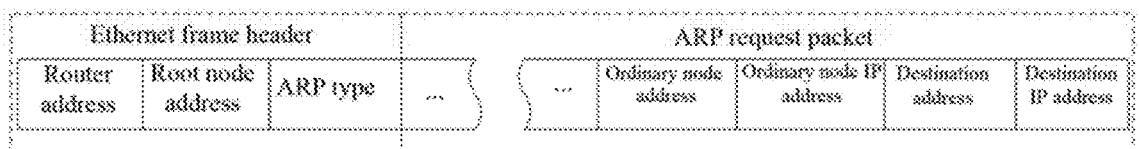
FIG. 20 is a structural diagram of a first ARP request packet sent by an ordinary node according to another embodiment of the invention.
Figure 21:
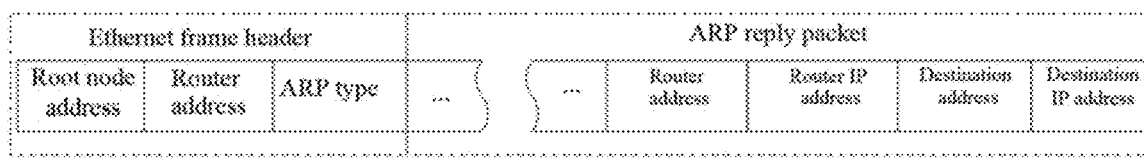
FIG. 21 is a structural diagram of a first ARP reply packet sent by a root node according to another embodiment of the invention.

After the root node receives the first ARP request packet sent by the ordinary node as shown in FIG. 20: the root node inquires its own ARP cache about whether there is any IP address satisfying the request, and if the IP address requested by the sending node is found in the ARP cache of the root node, the root node generates a first ARP reply packet as shown in FIG. 21 to the ordinary node.

In the present embodiment, the specific process of the root node sending the first ARP reply packet to the ordinary node is the same as the process in the above described embodiments of the node in the mesh network forwarding and/or processing the information packet sent from the router. When the root node performs adaptation to the TCP/IP layer, the root node needs to manage and maintain the mapping relation between the MAC address of and the port for the ordinary node, such that the root node may obtain the address of the ordinary node, which sends the ARP request packet, according to the mapping relation between the MAC address of and the port for the ordinary node, and then passes the first ARP reply packet through to the above described ordinary node over the mesh network.

Figure 22:
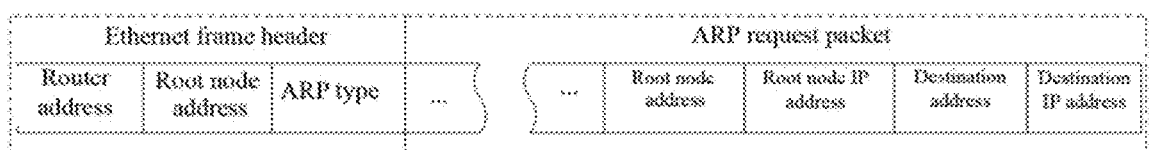
FIG. 22 is a structural diagram of a second ARP request packet sent by the root node according to another embodiment of the invention.

If the IP address requested by the sending node is not found in the ARP cache of the root node, the root node modifies the sending address in the first ARP request packet to the address of the root node itself, then generates and sends a second ARP request packet to the router, as shown in FIG. 22; after receiving a second ARP reply packet from the router, the root node refreshes its own ARP cache and passes the second ARP reply packet through to the above described ordinary node over the mesh network.

The main structural composition of the first ARP request packet is as shown in FIG. 20, in which the 802.3 Ethernet frame header of the first ARP request packet includes: a router address, an address of the root node, and an ARP type; the first ARP request packet body includes a sending address that is an address of an ordinary node and an IP address of an ordinary node; the first ARP request packet body also includes a destination address and a destination IP address.

The first and the second ARP reply packets have the same main structural composition, as shown in FIG. 21, in which the 802.3 Ethernet frame header of the ARP reply packet includes an address of the router, an address of the root node, and an ARP type; an ARP reply packet body includes a requested router address, an IP address of the router, a destination address and a destination IP address.

The main structural composition of the second ARP request packet is as shown in FIG. 22, in which the 802.3 Ethernet frame header of the second ARP request packet includes an address of the router, an address of the root node, and an ARP type; the sending address of the ARP request packet body is changed into the address of the root node and the IP address of the root node, and the destination address and the destination IP address of the second ARP request packet are the same as the destination address and the destination IP address in the ARP request packet body of the first ARP request packet.

Although the disclosure of the invention has been described in detail through the above described preferred embodiments, it should be understood that the above description should not be considered as limiting the invention. Upon reading the above disclosure, it will be apparent to those skilled in the art that various modifications and substitutions to the invention can be made. Therefore, the claimed scope of the invention shall be defined by the appended claims.

The invention claimed is:

1. A method for applying a TCP/IP protocol in a mesh network, comprising the steps of:
   step S1) constructing protocol stack models of a root node and one or more ordinary nodes in the mesh network;
   step S2) after the mesh network is established, the root node using a custom information element in a management frame to share an IP configuration acquired by the root node itself from a router, a MAC address of the root node itself, and a MAC address of the router with the one or more ordinary nodes within the mesh network;
   step S3) each node adopting a static IP configuration mode to set an IP configuration of the ordinary node itself as the IP configuration of the root node;
   step S4) the root node acquiring a port range available for each ordinary node; the root node mapping a MAC address of the ordinary node to a port in the port range according to a port configuration of each ordinary node, in order to enable IP datagram forwarding in a TCP/IP layer and a mesh layer in the protocol stack model of a corresponding ordinary node; and
   step S5) when one of the one or more ordinary nodes initiates communication with an external IP network through a TCP/IP protocol stack, the root node directly forwarding an IP datagram passed through from the ordinary node over the mesh network to the router, and the router transmitting the IP datagram to the external IP network; and the router forwarding an IP datagram received by the router from the external IP network to the root node, and the root node mapping a port number contained in the IP datagram to a MAC address of a corresponding node, and then sending the IP datagram to the corresponding node by way of pass-through over the mesh network.

2. The method for applying a TCP/IP protocol in a mesh network of claim 1, wherein in step S1, the protocol stack models of the one or more ordinary nodes and of the root node are, respectively:
   the protocol stack models on a SoftAP interface and a Station interface of each ordinary node respectively comprise in sequence: an application layer, a TCP/IP layer, a TCP/IP adaptation layer, a mesh layer, a data link layer, and a physical layer, wherein the TCP/IP adaptation layer is provided between the TCP/IP layer and the mesh layer for adaption between the TCP/IP layer and the mesh layer;
   the protocol stack model on a Station interface of the root node comprises in sequence: an application layer, a TCP/IP layer, a TCP/IP adaptation layer, a data link layer, and a physical layer; and
   the protocol stack model on a SoftAP interface of the root node is the same as that of each ordinary node; for each ordinary node, when sending a packet, the TCP/IP adaptation layer operates to modify a source address in a first Ethernet frame header generated by the TCP/IP layer to the address of the root node; and for the root node, the TCP/IP layer operates to manage and maintain a mapping relation between the address of and the port for the ordinary node.

3. The method for applying a TCP/IP protocol in a mesh network of claim 1, wherein in the mesh network, each ordinary node registers a respective port number with the root node; nodes in the mesh network are of a tree topology, any node of the one or more ordinary nodes determines a port range available for itself according to a level of the node and an AID of a corresponding parent node, and actively reports the port range to the root node;

the port range of any node of the ordinary nodes is calculated through the following formula:

($L\times1000+AID*100+0, L\times1000+AID*100+P$)

wherein L represents the level of the node in the mesh network, AID represents a number identifying a connection between the node and the corresponding parent node, and $0 < P < 99$.

4. The method for applying a TCP/IP protocol in a mesh network of claim 1, wherein the port range of each ordinary node in the mesh network is allocated by the root node.

5. The method for applying a TCP/IP protocol in a mesh network of claim 1, wherein in the step S5, when any node of the ordinary nodes initiates communication with the external IP network through the TCP/IP protocol, the method further comprises the steps of:

step S5.1.1) any node of the one or more ordinary nodes acting as a sending node, and a parent node of the node acting as an initial receiving node which receives an 802.11 frame generated by the sending node and sent to the parent node; the generation of the 802.11 frame comprising the following process: generating application data through the application layer in the protocol stack model of the sending node, transmitting the application data to the TCP/IP layer of the sending node, then the TCP/IP layer prefixing a TCP/IP header and a first Ethernet frame header to the application data in sequence so as to form an Ethernet frame, wherein the TCP/IP header is registered with and bond to the available port range of the sending node; at this point, the first Ethernet frame header containing a destination address, a source address, and a protocol type, wherein the source address is the address of the sending node; transmitting the Ethernet frame to the TCP/IP adaptation layer of the sending node, and the TCP/IP adaptation layer modifying the source address in the first Ethernet frame header to the address of the root node, so as to form a new Ethernet frame; the TCP/IP adaptation layer transmitting the new Ethernet frame to the mesh layer;

the mesh layer prefixing a mesh header to the new Ethernet frame, the mesh header containing a destination address and a source address, wherein the destination address is the same as the destination address contained in the first Ethernet frame header of the new Ethernet frame; according to routing of the destination address in the mesh network, the mesh layer prefixing a second Ethernet frame header to the mesh header, wherein the destination address contained in the second Ethernet frame header is the address of the initial receiving node, the source address contained in the second Ethernet frame header is the address of the sending node, and the protocol type is a custom mesh protocol type; the mesh layer transmitting the Ethernet frame with the second Ethernet frame header and the mesh header to the data link layer of the sending node;

the data link layer populating the 802.11 MAC header and the LLC header according to the second Ethernet frame header, and deleting the second Ethernet frame header to form an 802.11 frame, then sending the 802.11 frame from a Station interface at the physical layer to the initial receiving node; the 802.11 MAC header contains a BSSID, which is the address of the initial receiving node, a source address, which is the address of the sending node, and a destination address, which is the address of the initial receiving node;

step S5.1.2) after receiving the 802.11 frame through the SoftAP interface of a current receiving node, the current receiving node transmitting the 802.11 frame to the protocol stack model thereof for processing, which comprises the following process: the data link layer in the protocol stack model determining that the 802.11 frame is a mesh packet by detecting the custom mesh protocol type in the LLC header of the 802.11 frame, removing the 802.11 MAC header and the LLC header in the mesh packet, and transmitting the packet to the mesh layer in the protocol stack model; the mesh layer checking the destination address in the mesh header, and if it is determined that the destination address is not the address of the current receiving node itself or is not listed in a routing table of the current receiving node, then the mesh layer prefixes a second Ethernet frame header to the mesh header, wherein the second Ethernet frame header contains a destination address, which is the address of the parent node of the current receiving node, a source address, which is the address of the current receiving node, and a protocol type, which is the custom mesh protocol type; the mesh layer transmitting the Ethernet frame with the second Ethernet frame header to the data link layer of the current receiving node;

the data link layer of the current receiving node prefixing an 802.11 MAC header and an LLC header to the mesh header according to the second Ethernet frame header, and deleting the second Ethernet frame header to form a new 802.11 frame, wherein the 802.11 MAC header contains a BSSID, which is the address of the parent node of the current receiving node, a source address, which is the address of the receiving node, and a destination address, which is the address of the parent node of the current receiving node; the current receiving node sending the new 802.11 frame to the parent node thereof through the Station interface at the physical layer of the current receiving node;

step S5.1.3) when the current receiving node is not the root node, setting the parent node of the current receiving node as a new receiving node to repeat operations in the step S5.1.2.

6. The method for applying a TCP/IP protocol in a mesh network of claim 5, wherein in the step S5.1.3, when the current receiving node is the root node, a Wi-Fi SoftAP interface of the root node receives the 802.11 frame sent by the sending node and transmits the 802.11 frame to the data link layer of the root node, and then the data link layer determines that the 802.11 frame is a mesh packet by detecting the custom mesh protocol type in the LLC header of the 802.11 frame, removes the 802.11 MAC header and the LLC header in the mesh packet, and sends a remaining part of the 802.11 frame upward to the mesh layer of the root node; the mesh layer checks the destination address in the mesh header, if it is determined that the destination address is not the address of the root node itself or is not listed in the routing table of the root node, then removes the mesh header, and sends the remaining part of the Ethernet frame upward to the TCP/IP adaptation layer of the root node; if the TCP/IP adaptation layer checks and determines that the protocol type in the first Ethernet frame header in the Ethernet frame is an IP datagram, then transmits the Ethernet frame directly to the data link layer of the root node; the data link layer of the root node prefixes an 802.11 MAC header and an LLC header to the TCP/IP header according to the first Ethernet frame header, wherein the 802.11 MAC header contains a BSSID, which is the address of the router, a source address, which is the address of the root node, and a destination address, which is the same as the destination address in the first Ethernet frame header; the LLC header contains a protocol type which is the same as the protocol type in the first Ethernet frame header; the first Ethernet frame header is deleted to form a new 802.11 frame, and the 802.11 frame is sent to the router through the Station interface of the root node.

7. The method for applying a TCP/IP protocol in a mesh network of claim 6, wherein when the router forwards an IP datagram to any node in the mesh network, the method further comprises the steps of:
  step S5.2.1) the root node receiving an 802.11 frame forwarded by the router through the Station interface, and sending the 802.11 frame upward to the data link layer of the root node, the 802.11 frame comprising: an 802.11 MAC header, an LLC header, a TCP/IP header, and application data from an application layer; wherein the 802.11 MAC header contains a destination address, which is the address of the root node, a BSSID, which is the address of the router, and a source address, which is an address of a network device within the external IP network which generates the 802.11 frame; the LLC header contains a protocol type;
  the data link layer of the root node prefixing a first Ethernet frame header to the 802.11 frame according to the 802.11 MAC header and the LLC header of the 802.11 frame, deleting the 802.11 MAC header and the LLC header to form an Ethernet frame, and sending the Ethernet frame upward to the TCP/IP adaptation layer of the root node; wherein the first Ethernet frame header contains a destination address, which is the address of the root node, a source address, which is the address of the network device within the external IP network which generates the 802.11 frame, and a protocol type in the first Ethernet frame header is the same as the protocol type in the LLC header;
  if the TCP/IP adaptation layer of the root node determines, by mapping a destination port number contained in a TCP header or UDP header in the datagram, that the protocol type in the first Ethernet frame header is IP datagram, then determining an address of the destination node, and in turn determining whether the 802.11 frame is transmitted to root node itself or transmitted to a corresponding ordinary node within the mesh network;
  when the TCP/IP adaptation layer determines, by mapping the port number, that the destination address of the 802.11 frame is the address of the root node, the TCP/IP adaptation layer directly transmitting the Ethernet frame to the TCP/IP layer and the application layer of the root node.

8. The method for applying a TCP/IP protocol in a mesh network of claim 7, comprising the steps of:
  step S5.2.2) when the TCP/IP adaptation layer determines, by mapping the port number, that the destination address the 802.11 frame is an address of an ordinary node within the mesh network, the ordinary node corresponding to the address of the ordinary node acting as a destination node, and sending the Ethernet frame to the mesh layer of the root node; according to the routing of the destination node, the mesh layer prefixing the second Ethernet frame header and the mesh header to the Ethernet frame, and then transmitting the Ethernet frame to the data link layer of the root node; the mesh header contains a destination address, which is the address of the destination node, and a source address, which is the address of the root node; the second Ethernet frame header contains a destination address, which is a destination routing address, and at this point, the destination routing address being an address of a child node directly connected to the root node along a route to the destination node, a source address, which is the address of the root node, and a protocol type, which is the custom mesh protocol type;
  the data link layer populating the 802.11 MAC header and the LLC header according to the second Ethernet frame header, and deleting the second Ethernet frame header to form a new 802.11 frame; sending the 802.11 frame through the SoftAP interface to a node corresponding to the destination routing address in the 802.11 MAC header, and the node acting as a receiving node; wherein the 802.11 MAC header contains a destination address, which is the destination routing address populated with the destination address in the second Ethernet frame header, a BSSID, which is the address of the root node, and a source address, which is the address of the root node; the LLC header contains the custom mesh protocol type;
  step S5.2.3) after the receiving node receives the 802.11 frame through the Station interface, the data link layer of the receiving node knows, according to the LLC header, that the 802.11 frame is a mesh packet, and deletes the 802.11 MAC header and the LLC header, and then transmits the mesh packet to the mesh layer of the receiving node,
  the mesh layer checking the destination address in the mesh header, and when the destination address is the address of the receiving node, deleting the mesh header to form an Ethernet frame, and transmitting the Ethernet frame to the TCP/IP layer and the application layer of the receiving node in turn;
  step S5.2.4) when the destination address is listed in the routing table of the receiving node itself, the mesh layer prefixing the second Ethernet frame header to the mesh header, and then transmitting the Ethernet frame to the data link layer of the receiving node, and at this point, a destination routing address in the second Ethernet frame header is an address of a child node directly connected to the receiving node along a route to the destination node, a source address in the second Ethernet frame header is the address of the receiving node, and a protocol type in the second Ethernet frame header is the custom mesh protocol type; the data link layer populating the 802.11 MAC header and the LLC header according to the second Ethernet header, deleting the second Ethernet header to form a new 802.11 frame, wherein the 802.11 MAC header contains a destination address, which is the destination routing address populated with the destination address in the second Ethernet frame header, a BSSID, which is the address of the receiving node, and a source address, which is the address of the receiving node; the LLC header contains the custom mesh protocol type; the receiving node transmitting the new 802.11 frame downward to the child node corresponding to the destination routing address in the 802.11 MAC header of the new 802.11 frame; and
  step S5.2.5) if the child node is not the destination node corresponding to the destination address in the mesh header, setting the child node as a new receiving node to repeat operations in the steps S5.2.3 to S5.2.4.

9. The method for applying a TCP/IP protocol in a mesh network of claim 5, wherein when the 802.11 frame is an ARP request packet, upon receipt of the ARP request packet by the root node, the root node inquires an ARP cache of the root node about whether there is an IP address satisfying the request, and if the IP address requested by the sending node is found in the ARP cache of the root node, generates a first ARP reply packet to the sending node;

if the IP address requested by the sending node is not found in the ARP cache of the root node, the root node modifies a sending address in the ARP request packet to the address of the root node itself to generate a second ARP request packet, and then transmits the second ARP request packet to the router;

after receiving a second ARP reply packet fed back by the router, the root node refreshes the ARP cache thereof, and then transmits the second ARP reply packet to the sending node by way of pass-through over the mesh network.

10. The method for applying a TCP/IP protocol in a mesh network of claim 1, wherein an ARP request packet sent by the sending node comprises: an 802.3 Ethernet frame header, which contains a router address, a root node address, and an ARP type; an ARP request packet body, which contains a sending address including an ordinary node address and an ordinary node IP address; the ARP request packet body also contains a destination address, and a destination IP address;

wherein the first and the second ARP reply packets both comprises: an 802.3 Ethernet frame header, which contains a router address, a root node address, and an ARP type; an ARP reply packet body, which contains a requested router address, a router 1P address, a destination address, and a destination IP address;

the second ARP request packet comprises: an 802.3 Ethernet frame header, which contains a router address, a root node address, and an ARP type; an ARP request packet body, which contains a sending address that is changed into the root node address and a root node IP address, and a destination address and a destination IP address, which are the same as the destination address and the destination IP address in the ARP request packet body of the ARP request packet.

\* \* \* \* \*